April 5, 1938.   F. E. RUNGE   2,113,385
RECORDING APPARATUS
Filed Feb. 28, 1935
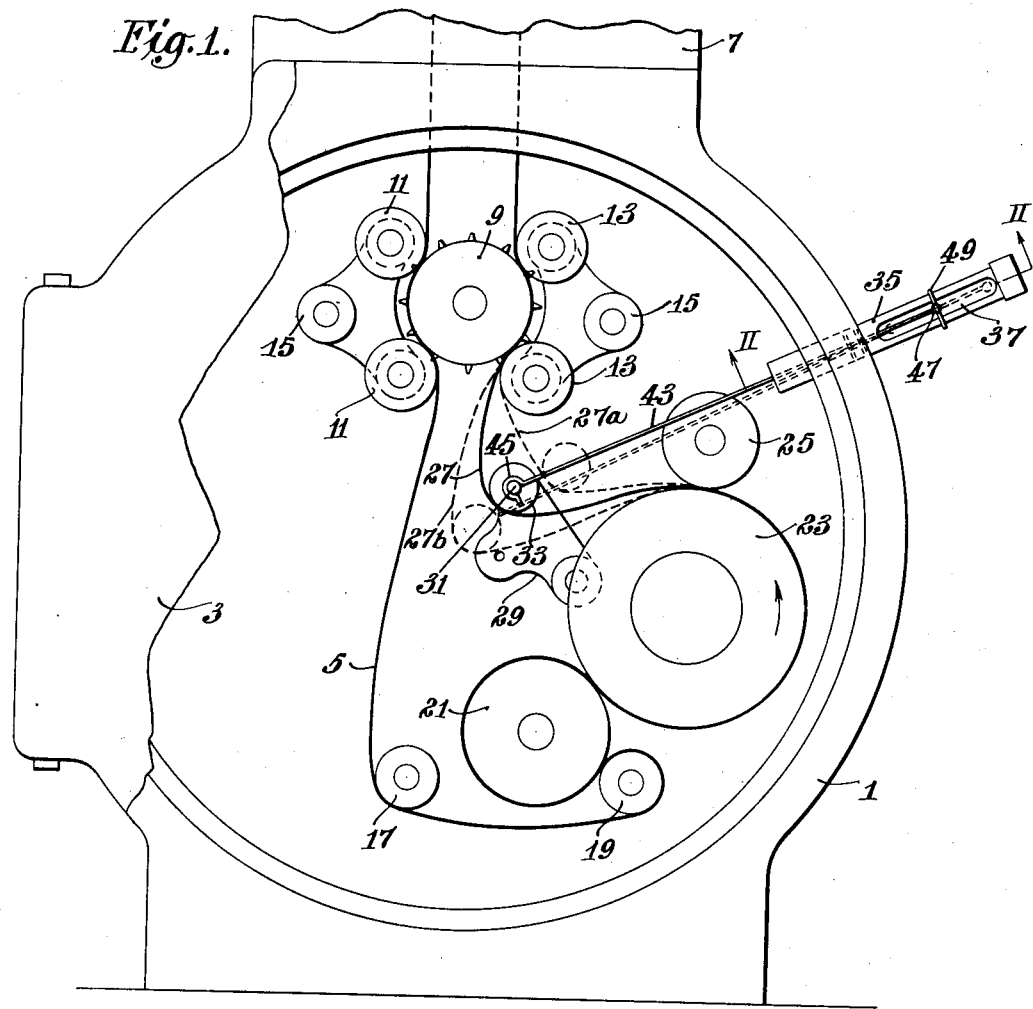
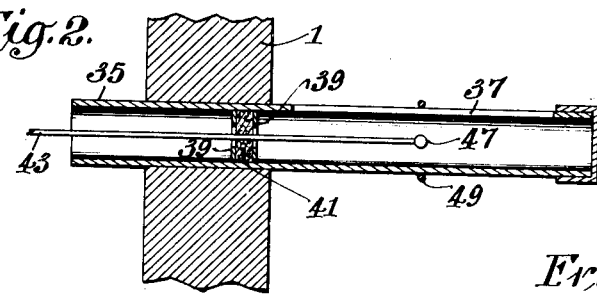
INVENTOR:
Frank E. Runge,
BY J. R. Goldsborough
ATTORNEY.

Patented Apr. 5, 1938

2,113,385

UNITED STATES PATENT OFFICE 2,113,385

RECORDING APPARATUS

Frank E. Runge, Oaklyn, N. J., assignor to Radio Corporation of America, a corporation of Delaware Application February 28, 1935, Serial No. 8,651

9 Claims. (Cl. 116—114)

This invention relates to recording apparatus, and more particularly to apparatus for recording sound or other impulses upon a moving film or tape.

In sound recording machines of the type shown in United States Patent No. 1,899,571, for example, a photosensitive film is fed through the recorder by a single sprocket which both draws the film from the magazine and feeds it back into the magazine and by a drum around which the film passes at the recording station. On the same shaft as that upon which the drum is mounted, there may be provided a mass and damping means for insuring uniform rotation of the drum, since variations in its speed would result in recordings which, when reproduced, would produce undesirable variations in pitch of the sound. In the patent above referred to, the damping means consists of a magnetic drive for the drum, the magnets thereof rotating somewhat faster than the drum. This tensions the film on the lead-on side of the drum as well as around the drum and leaves it relatively loose on the take-off side of the drum where a loop of film is formed.

Now, it happens, occasionally, that variations in speed of the drum occur, as, for example, by reason of a variation in voltage of the supply for the magnet coils. In such case, the recording obviously becomes spoiled, and unless the recording is stopped, much film may be wasted at considerable expense. With prior art machines, however, there was no way for the recordist to know when this condition arose except by opening the door of the machine and observing the size of the aforesaid loop. Obviously, however, this is entirely impractical with photosensitive film, since the admission of light to the recorder would ruin the film.

The primary object of my invention is to provide an improved recording machine which is not subject to the defects and disadvantages of prior art recorders.

More specifically, it is an object of my invention to provide, in a recording machine of the type noted above, means whereby the recordist is enabled to determine the path taken by the film so that the size or position of the film loop may be readily known.

Another object of my invention is to provide an improved recording machine for recording sound or other impulses wherein means external to the recorder will instantaneously indicate the position of the film loop within the recorder.

A further object of my invention is to provide, for recorders of the type specified above, indicating means as noted which can readily be applied to recording machines now in existence.

It is another object of my invention to provide indicating means as aforesaid which will be inexpensive, and yet highly efficient in use.

In accordance with my invention, I provide a suitable indicator which is fitted into the recorder casing and has a portion thereof externally of the casing for observation by the recordist. A slidable element in engagement with the film loop and actuable thereby moves within the indicator retaining means, and its outer portion may be observed through a window or opening therein. Any appreciable movement of the slidable element at once indicates that the recorder is not operating satisfactorily and the recorder may be stopped for necessary adjustments or corrections.

The novel features of my invention are set forth with particularity in the appended claims. The invention itself, however, together with additional objects and advantages thereof, will best be understood from the following description of a specific embodiment, when taken in connection with the accompanying drawing wherein Figure 1 is a side elevation of a recorder with my invention applied thereto, and Figure 2 is an enlarged sectional view taken on the line II—II of Figure 1.

Referring more specifically to the drawing, wherein similar reference characters indicate corresponding parts throughout, there is shown a casing 1 which, in cooperation with a door 3, constitutes a light tight enclosure for a film 5 which is fed from and to a magazine 7 by a sprocket 9, the sprocket guide rollers 11 and 13 holding the film in engagement with the sprocket 9. The rollers 11 and 13 may be withdrawn from or moved against the sprocket 9 by the use of well known eccentric means (not shown) controlled by the knobs 15.

In its course through the casing 1, the film 5, after leaving the sprocket 9, passes around a series of rollers 17, 19 and 21, being slightly bowed between the sprocket 9 and the roller 17 and again between the rollers 17 and 19. From the roller 21, the film passes tightly around the drum 23 against which it is pressed by a pressure roller 25 and where the recording is done, and thence back to the sprocket 9, a loop 27 being formed in the film between the drum 23 and the sprocket 9. By driving the drum 23 somewhat faster than the film, as by means of the magnetic drive shown in United States Patent 1,899,571, above referred to, the film 5 will be caused to wrap itself snugly around the roller 21 and the drum 23 whereby the film retains a definite position on the drum necessary to proper recording.

Pivoted to the casing 1 is an arm 29 carrying a shaft 31 on which is rotatably mounted a roller 33. This roller engages the film 5 at its loop 27 in the solid line position of the loop (Fig. 1) and holds the film in such a position relative to the drum 23 that, even were the roller 25 removed, the film would still snugly hub the drum, particularly at the recording point. It sometimes happens, however, that the drum varies in speed somewhat, or the sprocket 9 varies slightly from one cause or another, in which cases the film may have its speed more or less varied at the recording point, resulting in spoilage of the recording. Unless the recordist is immediately apprised of this, he may permit the recording to proceed, perhaps with continued or repeated variations in speed. Often, it may be impossible or very difficult to again have the recording artist render his selection, and the entire recording is thus lost.

To insure against the foregoing, I have taken advantage of the fact that a slowing down of the drum or a comparatively sudden speeding up of the sprocket 9 will cause the loop 27 to shorten and assume the dotted line position 27a. Conversely, if the drum should speed up or the sprocket suddenly slow down, the loop 27 will increase to the dotted line position 27b. In either case, the roller 33 will follow the loop, and this can be availed of to serve as an index of the recording condition of the machine.

For this purpose, a tubular retaining member 35 is tightly fitted into the casing 1 to project outwardly therefrom a substantial distance, the retainer 35 having a slot or opening therein which may be covered by a transparent window 37. Within the retainer 35, a pair of centrally apertured metal discs 39 may hold in place a felt or the like bearing member 41 in which a rod or the like 43 is movably mounted. The inner end of the rod 43 is formed, as with a hook 45, to engage the shaft 31, while the outer, or visible, end thereof may be colored or formed with an enlarged head 47 to be conspicuous. Now, as the loop 27 varies, the roller 33 will be moved about the pivot of the arm 29 and the rod 43 will be moved in or out, as the case may be, with respect to a reference mark on the retainer 35, such as a ring 49 thereon, or a scale on the window 37. Preferably, the ring 49 is slidable on the retainer 35 for ready adjustment or setting with respect to the head 47.

The rod 43 may, for example, be of such a length that when the loop 27 is in the solid line position, the head 47 will be in alignment with the reference mark 49. Any appreciable movement of the head 47 in response to variations of the loop 27 will, therefore, at once serve to warn the recordist that the recording is not proceeding properly. If desired, a pair of rings or markers 49 may be provided at spaced points so chosen that the head 47 is normally substantially midway therebetween. The recordist will then know that movement of the head 47 between these two reference marks will not deleteriously affect the recording, but that if the head 47 moves beyond either one or the other thereof, correction is necessary. As in the case of a single ring 49, if two or more rings are employed, they may each be adjustable on the retainer 35.

The bearing member 41 should be apertured centrally just enough to snugly accommodate the rod 43. Also, the felt bearing member 41 should, preferably, be oil saturated. This will not only allow the rod 43 to pass through it with little resistance, but will assist in keeping the device light tight and dust tight. By making the apertures in the metal discs 39 larger than that in the felt bearing disc, the weaving or mis-alignment of the rod 43 by reason of the arcuate movement of the shaft 31 will not be restrained and the device will work freely.

From the foregoing description, it will be apparent that I have provided a device for visibly indicating the operating condition of the film driving means, and particularly the path or the size of the film loop, and while I have shown and described but one embodiment thereof, it will be apparent to those skilled in the art that many modifications thereof are possible. Also, while I have described my invention with reference to a recorder, it will be apparent that it is equally applicable to reproducers, and the term "recorder", as used in this specification, is to be taken as synonymous with and equivalent to "reproducer". Furthermore, although I have described my invention as applied to photographic apparatus, it is to be understood that I contemplate its application to recorders and reproducers employing other forms of tape or the like records, such as steel tapes or steel wires on which sound or other impulses may be recorded and from which the same may be reproduced magnetically, or strips of material on which impulses are recorded mechanically, as by printing. My invention, therefore is not to be restricted except insofar as is necessitated by the prior art and by the spirit of the appended claims.

I claim as my invention:

1. In a recording machine for recording signals upon a photosensitive film, the combination of a light-tight casing, a photosensitive film movable in said casing and having a variable loop therein within said casing, and means responsive to variations in said loop and extending externally of said casing for indicating the size of said loop.

2. In a recording machine for recording signals upon a photosensitive film, the combination of a light-tight casing, a photosensitive film movable in said casing and having a variable loop therein within said casing, a retaining member on said casing extending outwardly therefrom, a bearing member in said retaining member, and means responsive to variations in said loop and movable in said bearing member for indicating the size of said loop.

3. In a recording machine, the combination of a casing, a moving film having a variable loop therein within said casing, a retaining member on said casing extending outwardly therefrom, a bearing member in said retaining member, said bearing member comprising a felt disc saturated with oil, and means responsive to variations in said loop and movable in said bearing member for indicating the size of said loop.

4. In a recording machine, the combination of a casing, a moving film having a loop therein within said casing, a retaining member on said casing extending outwardly therefrom and having a transparent window therein, a bearing member in said retaining member and means associated with said loop and movable in said bearing member for indicating the size of said loop, said indicating means being visible through said transparent window.

5. In a recording machine, the combination of a casing, a moving film having a loop therein within said casing, a retaining member on said casing extending outwardly therefrom, a bearing member in said retaining member, means associated with said loop and movable in said bearing member for indicating the size of said loop, and means constituting a reference mark movable on said retaining member for adjustment with respect to said indicating means.

6. The invention set forth in claim 4 characterized by the addition of a reference mark movable on said retaining member over said transparent window for adjustment with respect to said indicating means.

7. In a recording machine, the combination of a casing, a moving film having a variable loop therein within said casing, a pivotally mounted roller in engagement with said loop and movable about its pivot in response to variations in said loop, a retaining member on said casing extending outwardly therefrom, said retaining member having a transparent window therein, a bearing member in said retaining member, and a movable member associated with said roller and slidable in said bearing member in response to a pivotal movement of said roller for indicating, through said window, the size of said loop.

8. The invention set forth in claim 7 characterized in that said roller is mounted for rotation upon a shaft and said movable member comprises a rod provided with a hooked end in engagement with said shaft.

9. The invention set forth in claim 7 characterized in that said window is provided with a reference mark and characterized further in that said movable member comprises a rod the free end of which is conspicuous and may be initially set with respect to said mark.

FRANK E. RUNGE.